Jan. 9, 1951     A. PETROV     2,537,157
DOLL VOICE MECHANISM

Filed Feb. 13, 1946     3 Sheets-Sheet 1

INVENTOR
ARTHUR PETROV.
BY
ATTORNEY.

Jan. 9, 1951        A. PETROV        2,537,157

DOLL VOICE MECHANISM

Filed Feb. 13, 1946              3 Sheets-Sheet 2

INVENTOR.
ARTHUR PETROV
BY
ATTORNEY.

Jan. 9, 1951   A. PETROV   2,537,157
DOLL VOICE MECHANISM
Filed Feb. 13, 1946   3 Sheets-Sheet 3

INVENTOR
ARTHUR PETROV
BY
ATTORNEY.

Patented Jan. 9, 1951

2,537,157

UNITED STATES PATENT OFFICE 2,537,157

DOLL VOICE MECHANISM

Arthur Petrov, St. Louis, Mo.

Application February 13, 1946, Serial No. 647,275

1 Claim. (Cl. 46—186)

This invention relates to a doll voice mechanism, and more particularly to a sound producing device adapted to be positioned in dolls to utter articulate sounds in distinct syllables and words.

The primary object of the present invention is the provision of a doll voice mechanism which, when rocked from side to side, and whether or not positioned in a doll, will audibly utter sounds in phonetic simulation of two syllable words, namely "ma-ma" and "pa-pa" likened to a child's speech.

A further object of the invention is the provision of a device to articulate sounds whereby a crying sound likened to "ah" precedes the first syllable "ma" in the word "ma-ma."

A further object of the invention resides in providing a device of the character wherein a single valve key is actuated by three spaced stationary cams for controlling air forced through two sound emitting passages.

Further objects of the invention are to provide a device of the above character which will be small and light in weight, simple in construction, strong, durable, compact and highly efficient and reliable in use.

The foregoing and other objects and advantages of the invention will become apparent from a study of the following specification, read in connection with the accompanying drawings, wherein like characters of reference denote similar parts throughout the several views, and wherein.

Figure 1:
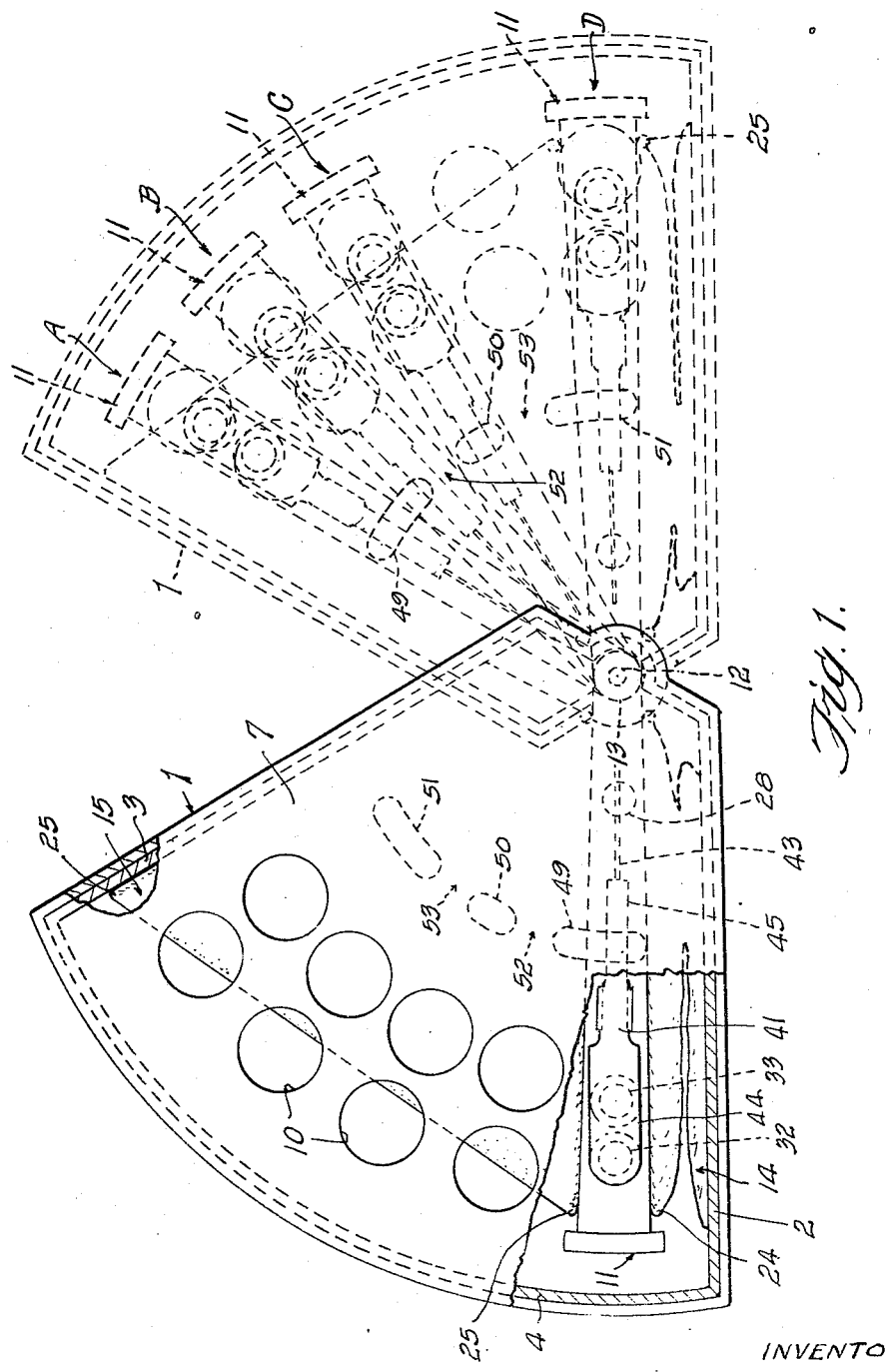
Fig. 1 is a front elevation of the articulative sound producing device with a portion of the casing broken away. It is shown in both full lines and in dotted lines in two tilted positions.

Briefly, the invention consists of a container, or casing having combined air inlets and sound outlets; an oscillative body having air inlets, air outlets and sound producing devices associated with the air outlets and which outlets also act as sound emitting passages, a bellows positioned on each side of oscillating body, a single valve key for controlling the air to be emitted from the sound emitting passages, and a plurality of spaced cams stationary relative to the casing for actuating the single valve key, all of which is so designed and assembled as to articulate distinct syllables and words when the device is rocked to and fro sideways.

The container, or casing for housing the several parts of the device is designated generally as 1, and the same comprises a body having a pair of side walls 2 and 3, a top wall 4 which is preferably, although not necessarily, curved outwardly and of such width that the side walls will converge downwardly and join with the side edges of a bottom wall 5, so as to provide a casing body that is V-shaped in front and rear elevation. The casing body thus formed is provided with open ends which are closed by means of a rear and front closure 6 and 7 having skirts 8 and 9, respectively, so that the closures will be cap shaped to be readily applied to the ends of the casing body. The casing body and the end closures are preferably, although not necessarily formed of plastic material, as they may be formed of sheet metal, fibre and the like. The closure 7 is provided with a plurality of suitably arranged openings 10 which serve both as air inlets and sound outlets.

When the casing is positioned within the chest or body portion of a doll, it is adapted to be suitably supported against displacement so that by rocking the doll to and fro sideways the casing will be stationary relative thereto. The casing is preferably supported within the doll body so that the end closure 7 will be positioned to the front of the doll.

The means to utter articulate sounds in distinct syllables and words contained within the container, or casing will now be described.

An oscillative body designated, generally, as 11, and V-shaped in rear and front elevation, is hinged, or pivotally connected at its lower end, as at 12 with a bearing member 13 suitably secured to the bottom wall 5 of the casing 1 so that it can be swung, or oscillated within the casing relative thereto when the casing is rocked or moved to and fro sideways.

The oscillative body 11 serves as an air intake and expelling member and is associated with a pair of bellows designated 14 and 15. The oscillative body 11 acts and serves as a single wall, or partition between the inner open ends of the bellows 14 and 15, as will be more clearly apparent hereinafter.

The oscillative body 11 is, preferably, although not necessarily formed of three parts designated 16, 17 and 18. The parts, or members 16 and 17 are, preferably, although not necessarily of molded plastic material. They are so fashioned and assembled as to provide a V-shaped recess 19 at the rear end portion thereof to receive a suitable V-shaped insert member 18, preferably, although not necessarily of lead, or other suitable heavy material to add weight to the upper end of the oscillative body 11 and render it top heavy. The top edge portion of the insert member 18 is preferably flanged laterally and projects forwardly to cap the plastic members from the rear to the forward edges thereof. The parts 16 and 17 are suitably cemented together and the insert member 18 is suitably cemented to the parts 16 and 17 to form a unit of the structure.

The parts 16 and 17 are provided on their outer faces with elliptical or ring shaped ribs 20 and 21, respectively, and the peripheral faces thereof are provided with endless grooves, or channels 22 and 23, respectively, adapted to receive the edges 24 and 25, respectively, at the open ends of the bellows 14 and 15, respectively, which bellows are formed of any suitable flexible material impervious to air such, for instance, as rubber material so that the open ends thereof can be readily snapped into position on the ribs 20 and 21, respectively. The outer end of the bellows 14 and 15 are suitably secured to the inner faces of the side walls 2 and 3, respectively, of the container, or casing body by means such, for instance, as adhesive cement.

The air intake and expelling member, or oscillative body 11 is provided with a T-shaped air inlet and a pair of suitable air and sound outlets leading from the interiors of the bellows 14 and 15.

Figure 2:
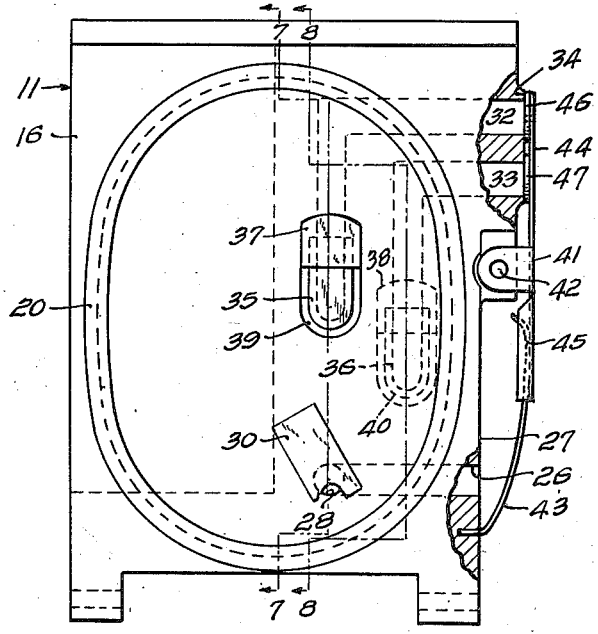
Fig. 2 is a left hand side elevation of the oscillative body including reeds and valve key.

The T-shaped air intake includes a horizontal passage 26 which starts from and which is open at its outer end to the front face 27 of the oscillative body 11 adjacent the lower end thereof, as clearly apparent from Fig. 2. The inner end of the passage 26 connects and communicates with axially aligned air passages 28 and 29 which are open to the side faces of the oscillative body 11 within the bounds of elliptical ribs 20 and 21, and which communicate at their outer ends with the interiors of the bellows 14 and 15, respectively. The outer ends of the axially aligned air inlets 28 and 29 are adapted to be closed and opened by means of a pair of suitable flap valves 30 and 31, respectively, suitably secured by means such as adhesive cement, to the side faces of the oscillative body 11 adjacent the outer ends of the axially aligned air inlets 28 and 29, as shown in Figs. 2 and 4.

The air and sound outlets leading from the interiors of the bellows 14 and 15 are designated 32 and 33, respectively. Outlet 32 is open at its inner end to the side face of the oscillative body 11, as shown in Fig. 2 within the bounds of the elliptical rib 20 and communicates with the interior of the left hand bellows 14, and the outer end of the oulet 32 is open to the front face 34 of the oscillative body 11 adjacent the upper edge thereof, which face is out of alignment with and offset in advance of face 27, as apparent from Fig. 2.

Figure 3:
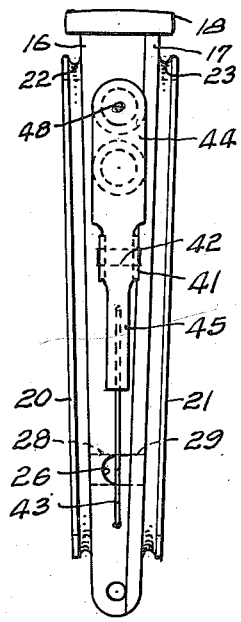
Fig. 3 is a front elevation of the oscillative body shown in Fig. 2.

The air and sound outlet, designated 33 is open at its inner end to the side of the oscillative body within the bounds of the elliptic rib 21 and communicates with the interior of the right hand bellows 15, and the outer end of the outlet 33 is open to the front face 34 of the oscillative body 11 adjacent and below the outer end of the outlet 32, as clearly apparent from Figs. 2 and 3.

Figure 4:
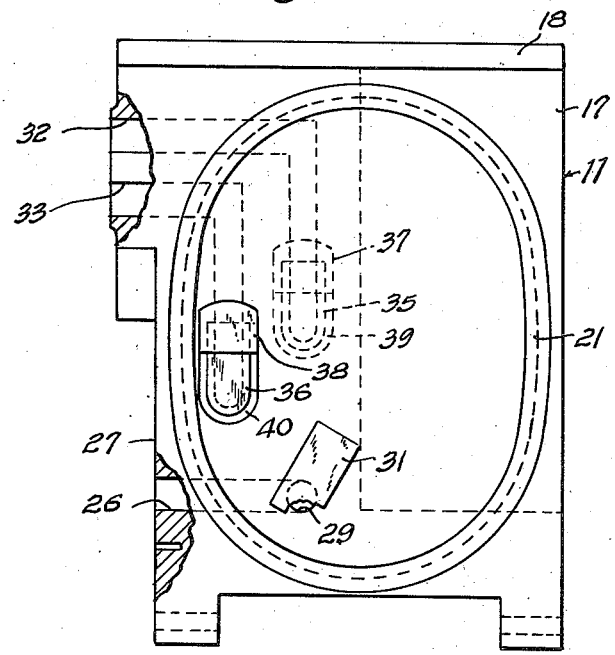
Fig. 4 is a right hand side elevation of the oscillative body including reeds and valve key.
Figure 5:
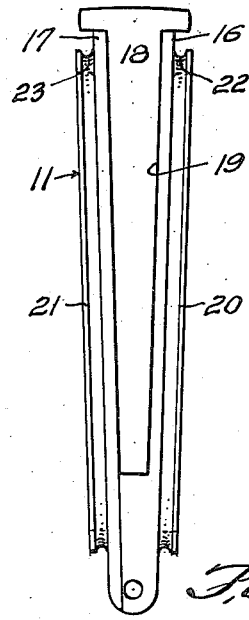
Fig. 5 is a rear elevation of the oscillative body shown in Fig. 4.
Figure 6:
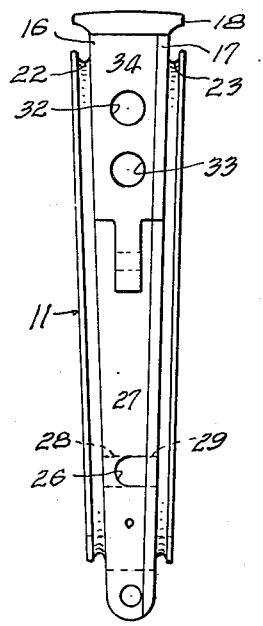
Fig. 6 is a front elevation of the oscillative body with the valve key removed.
Figure 7:
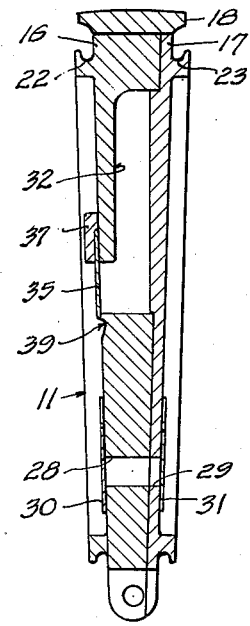
Fig. 7 is a sectional elevation taken on line 7—7 of Fig. 2.
Figure 8:
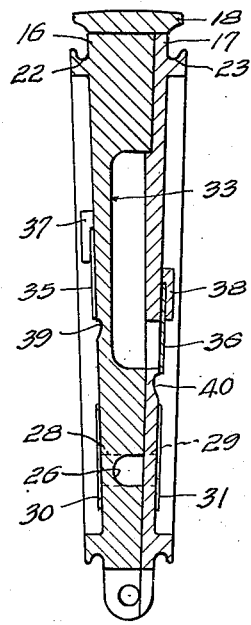
Fig. 8 is a sectional elevation taken on line 8—8 of Fig. 2.
Figure 9:
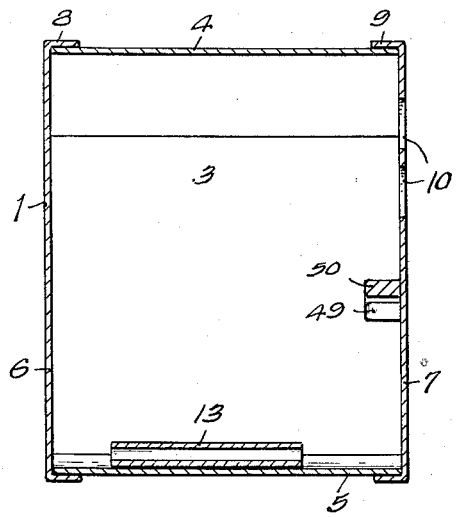
Fig. 9 is a vertical sectional view of the casing taken through the front and rear walls thereof.
Figure 10:
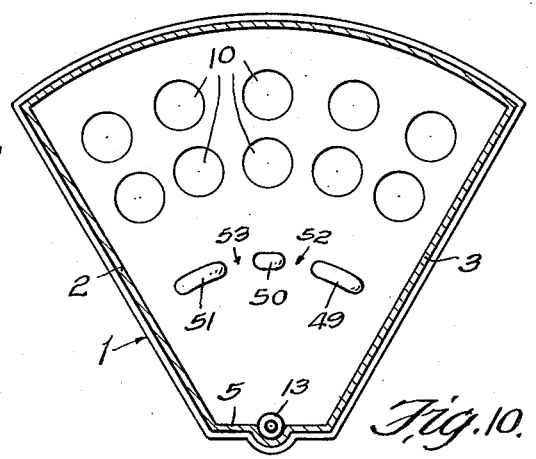
Fig. 10 is a vertical sectional elevation of the casing looking in direction of the front closure thereof.

The inner ends of the air and sound outlets 32 and 33 are covered by means of suitable reeds 35 and 36 which are suitably secured at their upper ends to the side faces of the oscillative body 11 by means of members 37 and 38 adhesively cemented to the side faces of the oscillative body 11, as apparent from Figs. 2 and 4. The side faces of the oscillative body 11 are suitably recessed as at 39 and 40 surrounding the inner end of the outlets 32 and 33, respectively, as apparent from Figs. 2 and 4, to permit air pressure within the bellows 14 and 15 to slightly lift the free ends of reeds 35 and 36 when air is being expelled from the bellows 14 and 15 to produce or pronounce the words "pa-pa" and "ma-ma," respectively, likened to vocal sounds and child's speech, which words, or sounds are clear and expressive.

The outer ends of the air and sound outlets, holes or passages 32 and 33 are normally closed by means of a single valve key 41 which is pivotally connected to the oscillative body 11, as at 42, and it is spring controlled in one direction of its movements, as at 43.

The single valve key employed and designated, generally, as 41 is located in front of the front face of the oscillative body 11. The upper end 44 of the key is flat and of such dimension as to cover both outlet ends of the air outlet and sound emitting passages 32 and 33, and, the opposite, or lower end of the key, which is in the form of a rocker lever 45 is channeled outwardly to receive the free end of the spring 43 which imparts outward pressure against the lower end of the key 41 to force pads 46 and 47 on the flat end 44 of the key against the flat front face of the oscillative body and normally close the outlet ends of the passages 32 and 33.

The suitable pad 46 is cemented to the inner face of the flat upper end 44 of the key 41 to close the outlet end of the passage 32, while the outlet end of the passage 33 is closed by the pad 47 on the flat end 44 of the key 41 adjacent the pad 46. The pad 46 and the corresponding portion of the flat end 44 of the body 41 is provided with a small central opening 48 to permit the slight escape of air therethrough preceding the actual uncovering of the air outlet and sound emitting passage 32 so as to produce a sort of crying sound likened to a sound "ah" preceding the first syllable "ma" when pronouncing the word "ma-ma" by compressing and discharging air from within the bellows 14, as will be more clearly apparent hereinafter.

The means for rocking the single valve key 41 controlling the air outlet and sound emission passages 32 and 33 includes three spaced cams 49, 50 and 51 which are stationary with relation to the casing body and they lie in the arcuate path of travel of the valve key which is pivotally carried on the front face of the oscillative body 11, so that when the body is rocked to and fro sideways, the spring actuated lever 45 of the valve key 41 will ride on the cam faces for opening the sound emission passages 32 and 33 and will enter the spaces 52 and 53 and vice-versa between the cams to cause the valve key 41 to close the air outlet and sound emission passages 32 and 33 due to the spring exerting pressure against the valve key 41. Both sound emission passages 32 and 33 are opened at the same time, and closed at the same time. Only one bellows is expelling air at a time. The other bellows is taking in air and sound is only produced by the bellows expelling the air, thus only one sound articulated syllable is produced at a time, although both sound emission passages are opened by the single valve key 41 which controls both sound emitting passages 32 and 33.

In moving the sound device from the position shown in full lines in Fig. 1 to the position shown in dotted lines, the following is the sequence of syllables articulated.

It will be noted that the bellows 14 is deflated and that the bellows 15 is inflated, and the air therein is at atmospheric pressure.

Now, when the casing has been moved to the dotted line position, from the full line position, the oscillative body 11 is in the position shown at A and the valve key 41 is in its open position relative to the sound emission passages 32 and 33, as the end 45 of the key 41 is held down by the cam 49. As the oscillative body 11 begins to swing downwardly, by gravity, to the position shown at B, it allows the lower end 45 of the key 41 to drop into the space 52 between the cams 49 and 50. No air is emitted from passage 32 except the slight amount of air that escapes through the vent 48 in the head portion of the valve key 41 which causes an "ah" sound to be articulated, which sound is more or less muffled as the air pressure has not been built up sufficiently in the bellows 15 for the articulation of the first syllable of the word "ma-ma" until the oscillative body 11 reaches the dotted line position shown at C and at which position the valve key 41 has been raised from the outlet end of the sound emitting passage 32 by the cam 50 causing the first syllable "ma" of the word "ma-ma" to be articulated. As the oscillative body 11 swings downwardly, the lower end of key 41 is released from the cam 50 and the key 41 is momentarily in its closed position due to the gap 53 between the cams 50 and 51, thus effecting a pause between the first and second syllables of the word "ma-ma." As the oscillative body 11 continues to swing into its final position shown in dotted lines at D, the valve key 41 is again raised from the outlet end of the sound emitting passage 32 by the cam 51 and this time the second syllable "ma" of the word "ma-ma" is articulated. The second syllable "ma" is drawn out for a longer period of time than the first syllable "ma" of the word "ma-ma" due to the difference in the lengths of the cams 50 and 51. When the oscillative body 11 comes to rest at position D, the valve key 41 remains in an open position. Thus, it will be clearly apparent that the three syllable word "ah-ma-ma" has been articulated, the syllable "ah" before pressure above atmospheric pressure has begun to build up within the bellows 15, the second syllable "ma" is articulated after the pressure has been built up, and then the third syllable "ma" is articulated during the final movement of the oscillative body 11 which completely deflates the bellows 15 as the bellows comes to rest.

When the casing is to be returned to the full line position from the dotted line position shown in Fig. 1, the bellows 14 which has been inflated to atmospheric pressure during the expelling of air from bellows 15 will be deflated and the bellows 15 will be inflated to atmospheric pressure.

Now, when the casing has been moved from the dotted line position to the full line position, the oscillative body 11 is still in a position that holds the valve key 41 open by means of the cam 51. As the oscillative body 11 falls or swings by gravity downwardly, the lower end 45 of the key 41 will enter the gap 53 between the cams 51 and 50 when it leaves cam 51. While the key 41 is held open by the cam 51, there will be no sound emitted as air pressure has not been built up sufficiently above atmospheric pressure until the key reaches the gap 53 which closes the key. Now, as the key 41 is opened by riding over the cam 50, the first syllable "pa" of the word "pa-pa" is articulated. Then, as the body 11 moves on the key 41 enters the gap 52 momentarily causing a pause between the first syllable "pa" and the second syllable "pa" to be articulated. The second syllable "pa" is articulated when the key is opened by riding on the cam 49 and it remains open until the casing is again turned sideways to the dotted line position. The second syllable "pa" of the word "pa-pa" is drawn out longer than the first syllable thereof due to the difference in the length of the cams 49 and 50.

From the foregoing description, it is clearly apparent that I provide a simplified means which when tilted to and fro sideways will alternately produce two different two syllable words due to the oscillative body connecting the two bellows following the laws of gravity and slowly assuming its normal gravitated position adjacent either side wall of the casing body, thereby deflating one bellows and at the same time inflating the other bellows, and, while deflating one bellows, by the gravity actuated oscillative body, produce the articulated sounds of the three syllable word "ah-ma-ma" through a sound emitting passage controlled by a single valve key controlled by three cam elements, and, while deflating the other bellows, by the gravity actuated oscillative body, produce the word "pa-pa" through a second and adjacent sound emitting passage controlled by the same valve key and cam elements while slowly moving to its normal gravitated position adjacent the opposite side wall of the casing body. By eliminating the small opening in the valve key at the sound outlet end of one of the sound emitting passages, the first syllable "ah" of the three syllable word "ah-ma-ma" will not be produced, thus, only the two syllables "ma-ma" will be sound articulated with a pause between the two syllables and with the last syllable drawing out longer than the first syllable as with the word "pa-pa."

What I claim is:

An oscillative V-shaped air intake and expelling body for sound producing devices for talking dolls consisting of two light weight side members and a third insert member of relatively heavy weight, laterally projecting flanges at the upper end of the insert member to cap the two side members, said members arranged and united to serve as a unit, ring like peripherally channeled ribs on the outer faces of the two side members to facilitate the attachment of bellows thereto, air passages open to the outer faces of the two side members and communicating with an air inlet open to the front face of the body, two other passages within the body each having at one end a flat reed controlled air and sound opening open to the outer face of each side member and open at their other ends respectively at different elevations to the front face of the body, a single valve member overlying both of said openings and hingedly mounted intermediate its ends on the front face of the body, and a spring anchored at one end to the body and engaging the valve member at its opposite free end to normally close the two air and sound openings which are open to the front face of the body.

ARTHUR PETROV.

REFERENCES CITED

The following references are of record in the file of this patent:

UNITED STATES PATENTS

| Number | Name | Date |
|---|---|---|
| 1,526,185 | Sigman et al. | Feb. 10, 1925 |
| 1,630,261 | Evans | May 31, 1927 |
| 1,642,767 | DeCesare | Sept. 20, 1927 |
| 2,174,594 | Petrov | Oct. 3, 1939 |